(12) United States Patent
Aviles

(10) Patent No.: US 7,979,671 B2
(45) Date of Patent: Jul. 12, 2011

(54) DUAL HASH INDEXING SYSTEM AND METHODOLOGY

(75) Inventor: Joaquin J. Aviles, Austin, TX (US)

(73) Assignee: CacheIQ, Inc., Austin, TX (US)

( * ) Notice: Subject to any disclaimer, the term of this patent is extended or adjusted under 35 U.S.C. 154(b) by 520 days.

(21) Appl. No.: 12/180,746

(22) Filed: Jul. 28, 2008

(65) Prior Publication Data

US 2010/0023726 A1 Jan. 28, 2010

(51) Int. Cl.
*G06F 12/08* (2006.01)

(52) U.S. Cl. .............. 711/216; 711/118; 711/E12.018; 370/395.32

(58) Field of Classification Search .................. None
See application file for complete search history.

(56) References Cited

U.S. PATENT DOCUMENTS

| | | | |
|---|---|---|---|
| 6,201,755 B1 | 3/2001 | Pillar et al. | |
| 7,177,941 B2 | 2/2007 | Biran et al. | |
| 7,248,585 B2* | 7/2007 | Kohn et al. | 370/392 |
| 2003/0081615 A1* | 5/2003 | Kohn et al. | 370/395.42 |

* cited by examiner

*Primary Examiner* — Kevin Verbrugge
(74) *Attorney, Agent, or Firm* — Hamilton & Terrile, LLP; Michael Rocco Cannatti

(57) ABSTRACT

A method, system and program are disclosed for accelerating data storage in a cache appliance that transparently monitors NFS and CIFS traffic between clients and NAS subsystems and caches files in a cache memory by using a dual hash technique to rapidly store and/or retrieve connection state information for cached connections in a plurality of index tables that are indexed by hashing network protocol address information with a pair of irreducible CRC hash algorithms to obtain an index to the memory location of the connection state information.

20 Claims, 8 Drawing Sheets

DUAL HASH INDEXING SYSTEM AND METHODOLOGY

BACKGROUND OF THE INVENTION

1. Field of the Invention

The present invention is directed in general to the field of computer storage networks. In one aspect, the present invention relates to a standalone cache memory device which is connected between one or more host machines and a storage device.

2. Description of the Related Art

Data storage technology over the years has evolved from a direct attached storage model (DAS) to using remote computer storage models, such as Network Attached Storage (NAS) and a Storage Area Network (SAN). With the direct storage model, the storage is directly attached to the workstations and application servers, but this creates numerous difficulties with the administration, backup, compliance and maintenance of the directly stored data. These difficulties are alleviated at least in part by separating the application server/workstations from the storage medium. For example, FIG. 1 depicts a typical NAS system 100 in which a number of PCs, workstations and application servers (clients) use a network 10 to access storage resources on a number of remote network attached storage and file servers (or filers). In the depicted system 100, each of the networked PC or workstation devices 12-14 and application servers 16-18 may act as a storage client that is connected to the network 10 by the appropriate routers 11 and switches 15 to remotely store and retrieve data with one or more NAS filers 1-6, which in turn are connected to the network 10 by the appropriate routers 9 and switches 7-8. Typically, the storage clients (e.g., 14) use an IP-based network protocol, such as CIFS and NFS, to communicate store, retrieve and modify files on an NAS filer (e.g., 5).

Conventional NAS devices are designed with data storage hardware components (including a plurality of hard disk drives, one or more processors for controlling access to the disk drives, I/O controller and high speed cache memory) and operating system and other software that provides data storage and access functions. Even with a high speed internal cache memory, the access response time for NAS devices continues to be outpaced by the faster processor speeds in the client devices 12-14, 16-18, especially where any one NAS device may be connected to a plurality of client storage devices. In part, this performance problem is caused by the lower cache hit rates that result from a combination of increased disk capacity and high-density mounting on the NAS storage device.

While a number of solutions have been proposed to address these problems, they are, for a variety of reasons, not entirely satisfactory. For example, faster disk drives have been developed, but the increased disk drive access speeds are not enough to overcome the performance gap. Other solutions have proposed increasing the size and speed of the cache memory at the NAS device(s), but this results in increased costs in terms of expense, chip size and power consumption. Even with improvements in hardware performance speed, there remain data processing performance limitations associated with monitoring and routing packet data, especially in communication networks where there are a large number of potential connections. For example, a communication node in a large network which inspects and routes network transport packets or frames will typically be required to perform an extensive search of a large connection table (e.g., 1M connections) to determine if the packet needs to be forwarded or not. And while there have been solutions proposed to expedite the connection table search process, such solutions can introduce collision errors when the processing of different packets points to the same connection state information in the connection state table. Accordingly, there is a need for a system and method for improving the disk storage access time and/or network packet processing to overcome the problems in the art, such as outlined above. Further limitations and disadvantages of conventional solutions will become apparent to one of skill in the art after reviewing the remainder of the present application with reference to the drawings and detailed description which follow.

SUMMARY OF THE INVENTION

A high-performance, scalable, stand-alone intelligent cache appliance and methodology are provided which use a dual hash algorithm to rapidly store and monitor NFS and CIFS traffic between clients and NAS subsystems in response to clients that make read and write requests for these files. When positioned between the storage clients and the NAS filers, the intelligent cache appliance intercepts all requests between the clients and filers and provides read and write cache acceleration by storing and recalling frequently used information. By snooping network protocol traffic state parameters and splicing connections between filers and clients, the intelligent cache appliance provides Open System Interconnect (OSI) transparency, thereby performing in the Ethernet network as a bump-in-the-wire. Instead of performing an extensive search of a large (e.g., 1M) connection state table to determine if a connection is cached at the cache appliance, the cache appliance uses a consistent-hash algorithm for storing and locating its connection state data. The consistent-hash algorithm guarantees that the location of the data is unique and deterministic, and is mathematically computed at a fixed processing cost that is much faster than the typical extensive search time. In selected embodiments, the consistent-hash algorithm employs two distinct irreducible Cyclic Redundant Check (CRC) hashes that are applied to a pre-defined n-tuple that is extracted from each network packet. For connections that are cached at the appliance, the first hash is used to generate a memory pointer to an index table which can store a predetermined number of entries, the second hash is stored as an index in the index table, and a unique identifier is stored as the output of the index table to identify a location in memory for storing the connection state information for the cached connection. With this arrangement, a received packet is identified as corresponding to a cached network connection by calculating the dual hash values from the received packet to see if there is a matched index table entry. If so, the corresponding connection data is located using the unique identifier from the matched entry.

In accordance with various embodiments, a data operation (such as a request to read or write a file from a networked storage device) may be adaptively cached or serviced by a non-disruptive storage cache appliance which uses packet inspection intelligence to splice connections under software control using the methodologies and/or apparatuses described herein, which may be implemented in a standalone cache appliance with computer program code comprising computer executable instructions. In whatever form implemented, the standalone cache unit includes a cache memory that caches data requested by a remote client and stores index tables and a connection state table for each connection used to cache data in the cache memory. The cache unit also includes a packet processor for transparently splicing connections between the data storage devices and remote clients. The packet processor inspects network protocol traffic state parameters received on the I/O ports to determine if a request from a remote client can be serviced by the standalone cache unit. Packet inspection is performed by extracting connection information from each received packet, such as by extracting an n-tuple from each received packet that is assembled from at least the SIP, DIP, DP, and SP segments from each received packet. First and second hash values are then generated from the connection information, such as by applying two irreducible CRC hash functions to the connection information. The first hash value is used to point to an addressed index table from the plurality of index tables, such as by shifting the first hash value by a predetermined number of bit positions. The second hash value is stored as an index to an entry in the addressed index table. In that same entry, aa connection data index value is stored which is used to point to an address for the connection state table corresponding to the received packet, such as by shifting the connection data index value by a predetermined number of bit positions. With this arrangement, each index table in the cache memory contains one or more entries for storing the second hash values from connections that would otherwise collide if only the first hash value was used, where each entry has an index portion (which stores a second hash value computed from one of the cached connections) and an output portion (which stores a connection data index value which is used to point to an address for the connection state table corresponding to the received packet). The disclosed dual hash indexing scheme is used by the packet processor to execute software that transparently monitors NFS and CIFS traffic between remote clients and NAS subsystems.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

Figure 1:
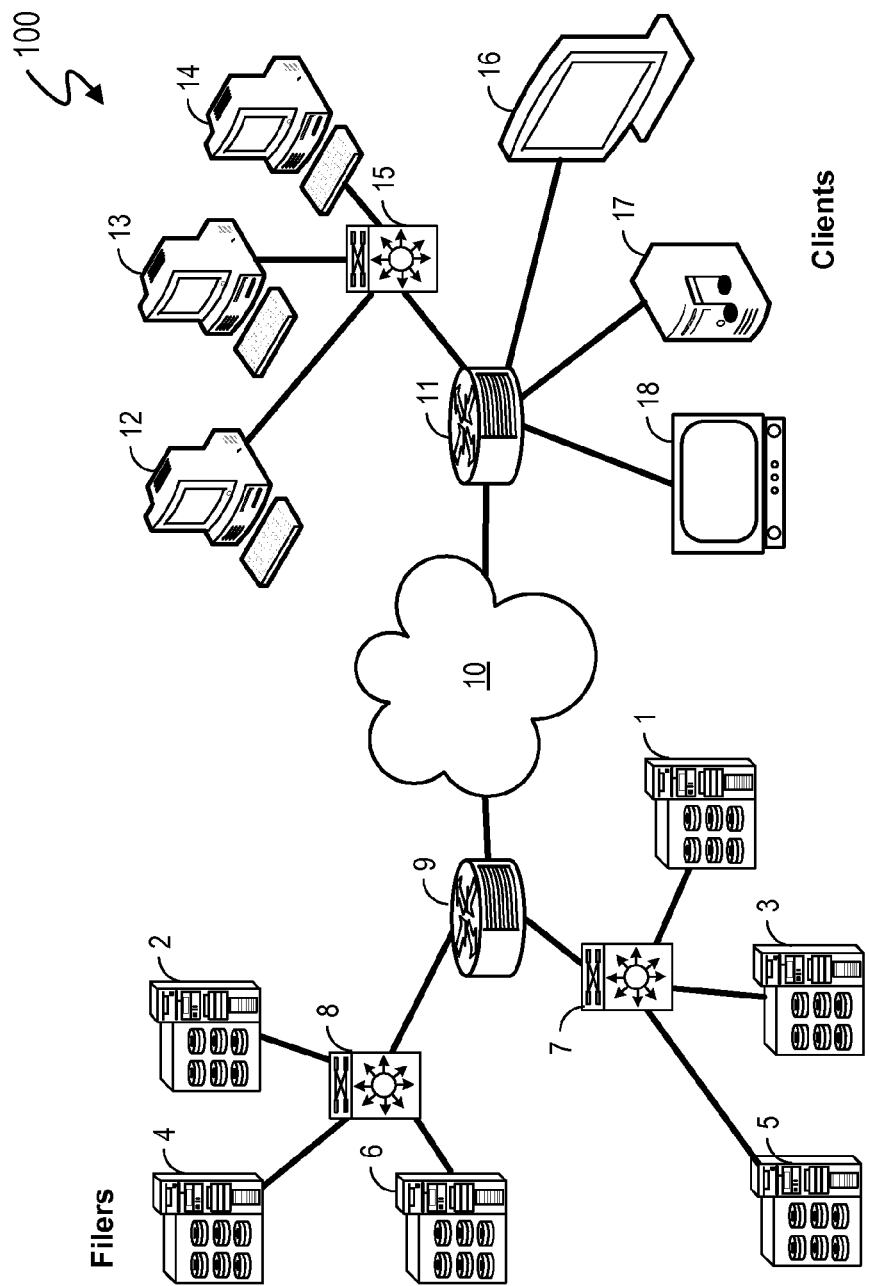
FIG. 1 depicts a typical NAS system in which client devices use a network to access storage resources on a number of remote network attached storage and file servers.

A method, system and program are disclosed for accelerating data storage access by caching selected data in a scalable, stand-alone cache appliance that transparently monitors NFS and CIFS traffic between clients and NAS subsystems and caches files using dynamically adjustable cache policies that reflect the business requirements and/or application workloads that change over time. In selected embodiments, one or more cache appliances may be connected or clustered together in front of an NAS filer (group) to provide low-latency access and redundancy in responding to both read and write requests for cached files, thereby improving access time to the data stored on the disk-based NAS filer (group). Instead of using a large table of connection state information, a dual hash technique rapidly stores and/or retrieves connection state information for cached connections using a plurality of index tables that are indexed by hashing network protocol address information with a pair of irreducible CRC hash algorithms to obtain an index to the memory location of the connection state information. In an example dual hash embodiment, the cache appliance extracts a connection identifier from each received network packet, such as an n-tuple formed with the source IP (SIP), destination IP (DIP), source port (SP), and destination port (DP), virtual LAN (VLAN), type, protocol, and media access control (MAC) segments, or any sub-combination of the foregoing. The cache appliance then uses the connection identifier/n-tuple to generate two hash values using two irreducible polynomial CRC hash functions. The first hash value is shifted a predetermined number of n spaces, and is then used as a memory pointer to an index table which has a predetermined number (e.g., $2^n$) of entries. The second hash value is then stored as an index value for an available entry in the index table, while a unique identifier (or connection state information) is stored as the output value of the available entry in the index table. With this construction, a cached network connection is identified by calculating the first and second hash values from a received network packet, and then accessing the index tables with the first hash value to see if it contains an index value that matches the second hash value. If there is a match, the unique identifier from the matched entry is shifted a predetermined number of m spaces, and is then used as a memory pointer to a memory location in memory for the connection state information, where the memory location has a predetermined number (e.g., $2^m$) entries for storing the connection state information for the received network packet. By using the dual hash scheme as described herein, the cache appliance(s) can rapidly store and retrieve connection state information with multi-GB non-volatile, inexpensive, low power cache memory for dynamically caching data in accordance with adjustable caching policies to reflect business requirements, to implement content matching algorithms and/or to reflect time-varying file access patterns, network utilization, file sizes and client load. The adjustable caching policies may be defined by the user as application profiles that identify application data sets and create policies that automate the management of those data sets in order to influence what files are to be cached and when. For example, application profiles may be used to identify a set of files that, when served from the cache appliance cluster, will increase the overall performance of the application by reducing or eliminating I/O bottlenecks. Application profiles may also be used to give higher caching priority to selected application data sets that have a positive impact on business, while giving lower caching priority to other application data sets. In addition, application profiles may be used to determine schedules for caching data sets from predetermined applications and/or to identify application clients whose application data sets are to be cached.

Various illustrative embodiments of the present invention will now be described in detail with reference to the accompanying figures. It will be understood that the flowchart illustrations and/or block diagrams described herein can be implemented in whole or in part by dedicated hardware circuits, firmware and/or computer program instructions which are provided to a processor of a general purpose computer, special purpose computer, or other programmable data processing apparatus to produce a machine, such that the instructions (which execute via the processor of the computer or other programmable data processing apparatus) implement the functions/acts specified in the flowchart and/or block diagram block or blocks. In addition, while various details are set forth in the following description, it will be appreciated that the present invention may be practiced without these specific details, and that numerous implementation-specific decisions may be made to the invention described herein to achieve the device designer's specific goals, such as compliance with technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Figure 2:
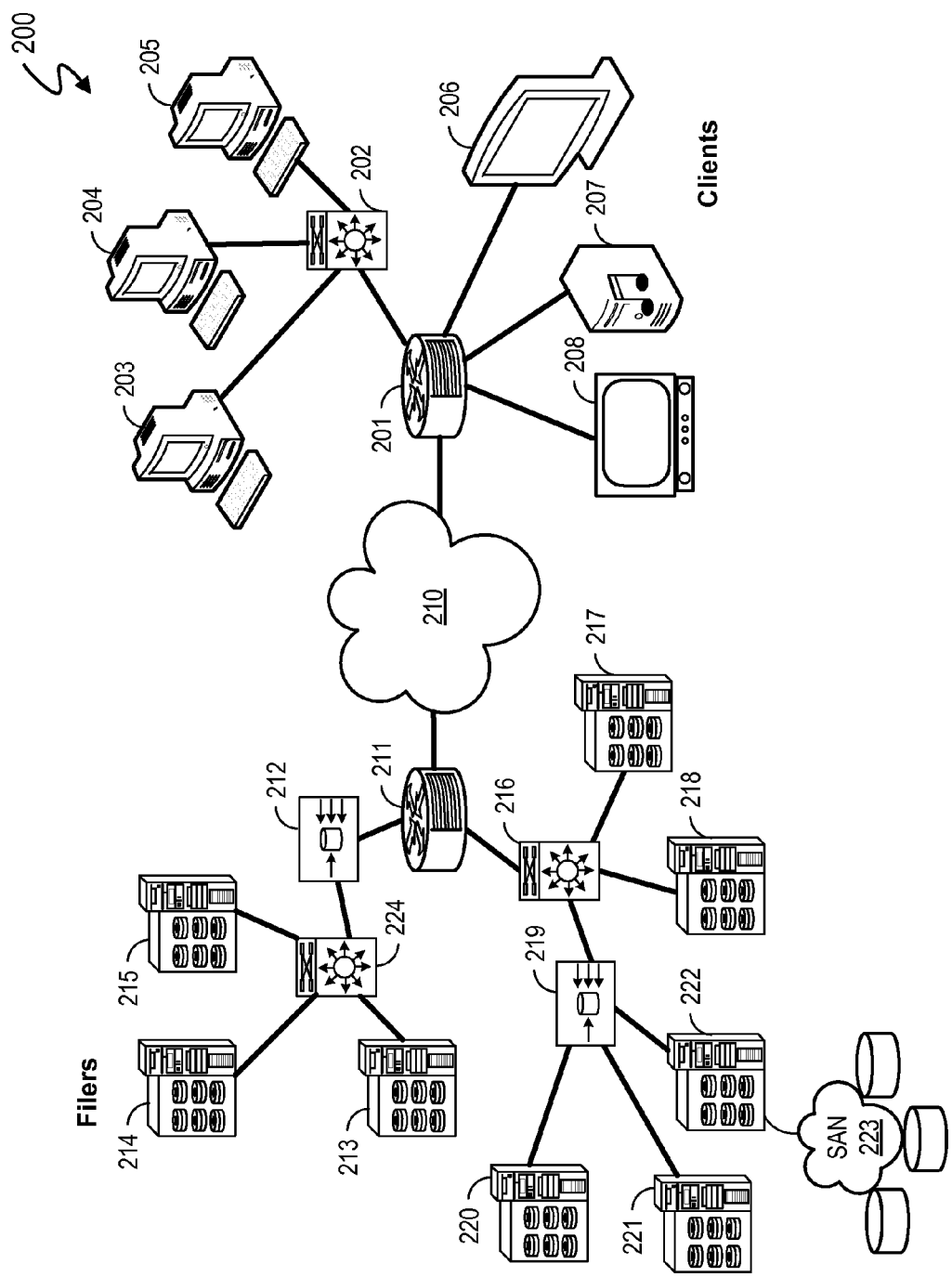
FIG. 2 depicts an enterprise storage network system in which one or more intelligent cache appliances may be located in front of a file server or a plurality of file servers.

Referring to FIG. 2, a diagram depicts an example enterprise storage network system 200 in which one or more intelligent cache appliances (e.g., 212, 219) may be located in front of a file server group (e.g., 213-215) or a file server (e.g., 222). The depicted storage network system 200 includes one or more storage clients, such as mobile or desktop PCs or workstations 203-205 or application servers 206-208. Each of the storage clients may run a separate application which requires access to remotely-stored application data. When the application data is stored in one of the NAS filers, the storage client sends a read or write request over the network 210 using the appropriate routers 201, 211 and/or switches 202, 216, 224. Such requests may be sent to the destination NAS filer using an appropriate IP-based network protocol, such as CIFS or NFS. However, when an intelligent cache appliance is installed in-line between the storage clients and a destination NAS filer, the request to read or write application data may be processed more quickly from the cache appliance's memory than would otherwise occur if the application data were processed from the disk arrays or cache memory in the NAS filer. In this description, a reference to a cache appliance (e.g.,. 212) may include one or more cache appliances that are connected or clustered together and working in tandem to form a single homogeneous caching device, as described more fully below. In addition, it will be appreciated that each cache appliance may be constructed as a high-speed packet processor with a substantial cache memory by including a set of network processing resources (such as a network switch and network processor(s)), a dynamic cache memory, a non-volatile cache memory and cache controller(s).

As indicated in FIG. 2, the intelligent cache appliances may be installed in a variety of different locations in the enterprise storage network 200 to provide the caching benefits to a one or more NAS filers (as shown by the placement of the cache appliance 219 in relation to NAS filers 220-222) or to a group of NAS filers (as shown by the placement of the cache appliance 212 in relation to the switched NAS filers 213-215). However positioned, the cache appliance operates to intercept all requests between the storage clients and the filers fronted by the cache appliance and provide read and write cache acceleration by storing and recalling frequently used information. Obviously, for this to occur, the cache appliance must be the only path that is able to reach the filers from the clients, and if any other path is available, cache coherency problems arise when a piece of information stored on the cluster is modified through an alternate path.

When provided with packet inspection capability, each cache appliance 212, 219 is able to inspect the packet information in each of the TCP/IP stack layers to determine the physical port information for the sender and receiver from the L2 data link layer, the logical port information for the sender and receiver from the L3 network layer, the TCP/UDP protocol connection information from the L4 transport layer, and the NSF/CIFS storage protocol information from the L5 session layer. In addition, the packet inspection capability enables each cache appliance to be spliced seamlessly into the network so that it is transparent to the L3 and L4 layers and only impacts the storage requests by processing them for the purposes of accelerating them, i.e., as a bump-in-the-wire. Rather than splicing all of the connection parameters in the L2, L3 and L4 layers, each cache appliance splices only the connection state, source sequence number and destination sequence number in the L4 layer. By leaving unchanged the source and destination MAC addresses in the L2 layer, the source and destination IP addresses in the L3 layer and the source and destination port numbers in the L4 layer, a client perceives that it is communicating with the filer, and vice versa, and there is no awareness at either the client or filer of any intervening cache appliance. With this approach, the spliced connections between clients and filers are separated to meet the data needs of the client from the cache, while providing periodic updates to meet the connection timeout protocol requirements of the filer. In selected embodiments, a read or write request is processed at the cache appliance by making only layer 1 and layer 2 configuration changes during installation or deployment, and as a result, no filer or client configuration changes are required in order to take advantage of the cache. With this capability, an installed cache appliance provides a fast and transparent storage caching solution which allows the same connections to be maintained between clients and filers. And if there is a failure at the cache appliance, the cache appliance automatically becomes a wire between the client and filer who are able to communication directly without any reconfiguration.

Figure 3:
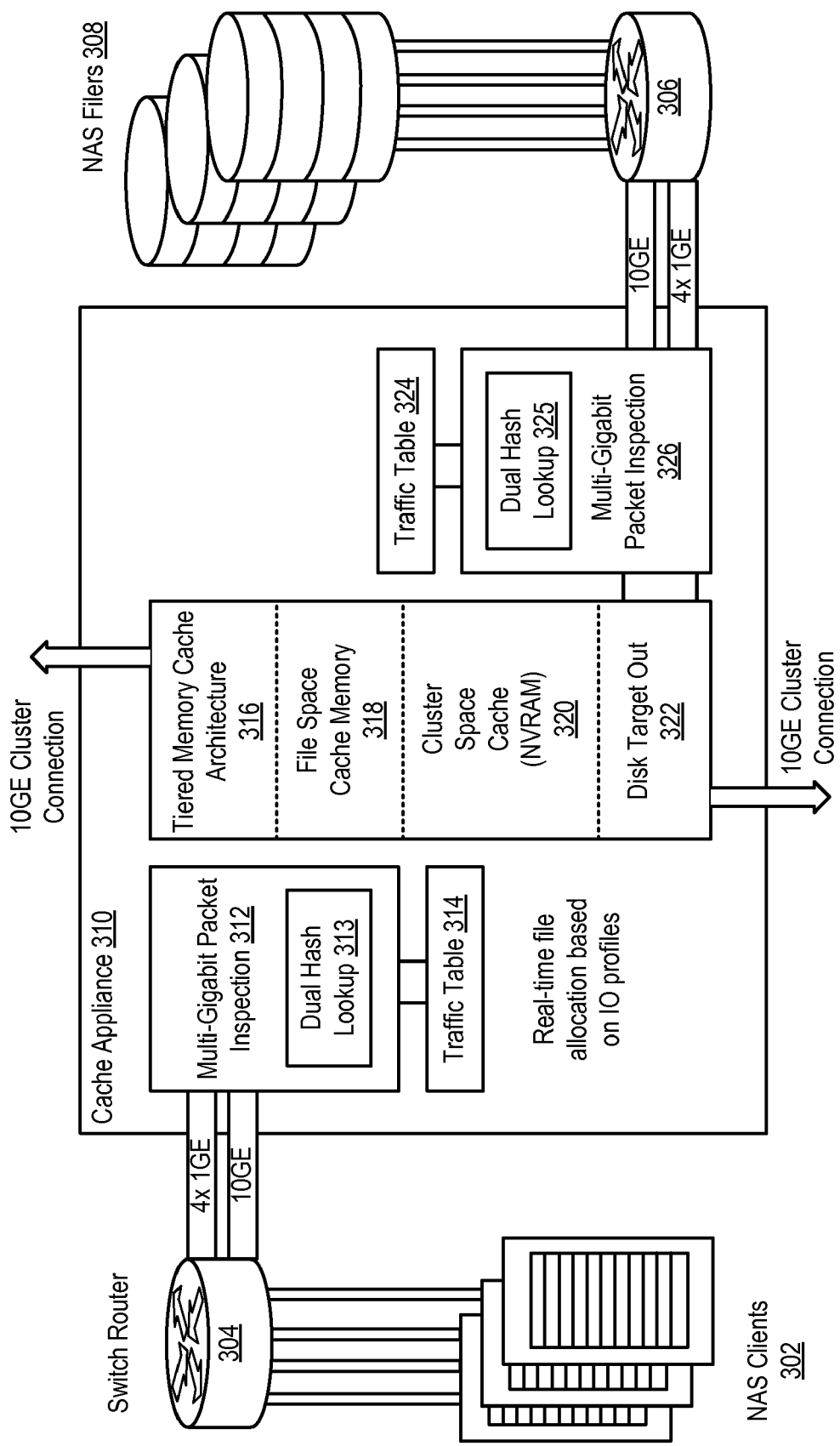
FIG. 3 depicts the functional operation of a non-disruptive storage cache appliance with packet inspection intelligence which uses a dual hash store and lookup module to store and retrieve connection state information.

The functional operation of the packet inspection intelligence which uses a dual hash store and lookup module to store and retrieve connection state information in the cache appliance may be described with reference to FIG. 3 which depicts the operation of a non-disruptive storage cache appliance 310 that is connected in-line between one or more NAS clients 302 and a switching router 304 (on the one hand) and one or more NAS filers 308 and a switching router 306. When a request to read or write application data is received from a storage client 302, the cache appliance 310 uses dedicated, high-speed packet inspection hardware 312 to inspect the packets of incoming requests to determine if they should be passed inward for further processing by the cache appliance 310 or forwarded to another destination, such as a NAS filer 308. To this end, the packet inspection hardware 312 includes a dual hash lookup module 313 for storing and retrieving information, for example connection information and/or any other type of information, associated with packets, frames, and/or cells in the communications network. If the NAS client 302 requests application data that is stored on the cache appliance 310, the packet inspection hardware 312 may process the request packets by using the dual hash lookup module 313 to generate two irreducible CRC hash values from each request packet. The two hash values are used by the packet inspection hardware 312 to quickly access the upstream traffic table 314 to perform real-time file allocation based on I/O profiles. By implementing the traffic table 314 as a plurality of index tables which are located with the first hash value, each index table can store a plurality of connection indices which are indexed by the second hash value and which specify a memory address location for a connection state table for the request packet. If the packet inspection indicates that the request is to be processed by the cache appliance 310, the request is passed internally to the tiered memory cache system 316 which controls the cache storage into tiers. For example, tier 1 storage is reserved for the most critical data (including email, high transaction databases, business critical processes and line of business applications), while tier 0 storage refers to an in-band, network-resident, policy-driven, high-performance, scalable tier of memory subsystems that is used for the storage of business critical data under control of a policy engine that is managed independently from the one or more NAS filers. Within the tiered memory, a dynamic cache memory 318 provides a file space for caching application data, while a non-volatile random access memory (NVRAM) 320 provides a space for caching pending write operations to NAS filers for the purpose of maintaining data coherency in a failure event, such as network packets not arriving to their destination. If it is determined that the request can not be serviced by the cache appliance 310, the output module 322 outputs the client request the disk target in the destination NAS 308.

In similar fashion, when a response to a request to read or write application data is received from an NAS filer 308, the cache appliance 310 uses dedicated, high-speed packet inspection hardware 326 to inspect the packets of incoming responses to determine if they should be passed inward for further processing by the cache appliance 310 or forwarded to another destination. To assist with this determination, the packet inspection hardware 326 may also include a dual hash lookup module 325 for storing and retrieving connection state information and/or any other type of information, associated with packets, frames, and/or cells in the communications network. If the NAS filer 308 returns application data in response to a read request, the packet inspection hardware 326 may process the response for possible caching at the cache appliance 310 by using the dual hash lookup module 325 to generate two irreducible CRC hash values from each response packet. The two hash values are used by the packet inspection hardware 325 to quickly access the downstream traffic table 324 to perform real-time file allocation based on I/O profiles. By implementing the traffic table 324 as a plurality of index tables which are located with the first hash value, each index table can store a plurality of connection indices which are indexed by the second hash value and which specify a memory address location for a connection state table for the response packet. If the packet inspection indicates that the request is to be processed by the cache appliance 310, the request is passed internally to the tiered memory cache system 316 which controls the cache storage into tiers.

Figure 4:
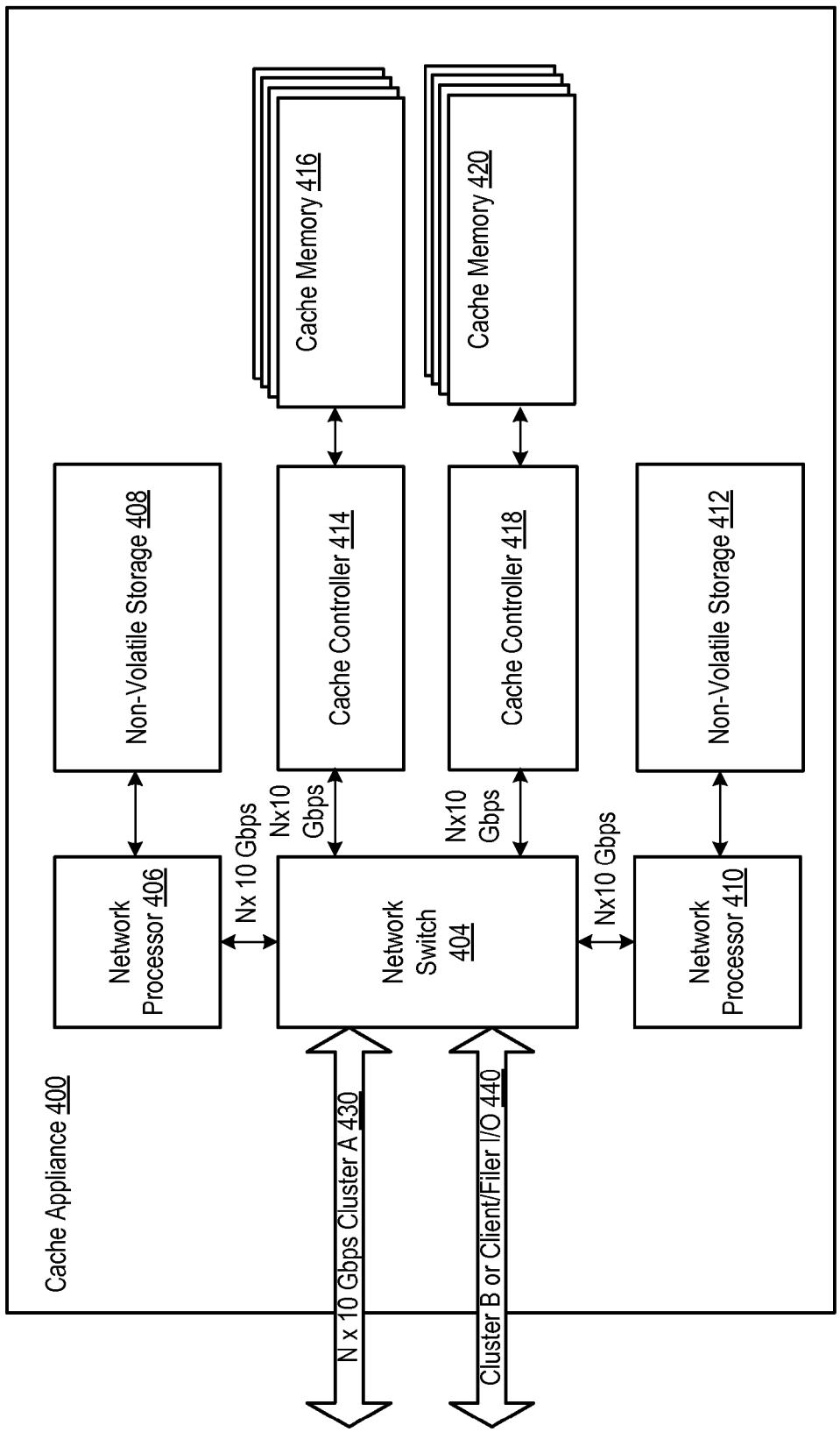
FIG. 4 is a block diagram of a cache appliance which uses cache memory in accordance with selected embodiments of the present invention.

As described herein, the cache appliance is the fundamental element of the data storage cache system, and is implemented as a combination of a high-speed packet processor and a large cache memory. While a variety of different architectures may be used to implement the cache appliance, FIG. 4 depicts in block diagram form an example hardware implementation of a cache appliance 400 which may be used in connection with selected embodiments of the present invention to provide network interfaces, packet processing and cache memory. To provide these functions, the cache appliance 400 includes a network switch interconnect component for routing network traffic, a network processor component for packet processing, and a cache controller and a cache memory component for storing cached data files.

The central element of the cache appliance hardware 400 is a high-speed network switch 404. The network switch 404 provides client and filer interfaces, 10 Gbps cluster interfaces, and multiple 10 Gbps connections to the packet processing and cache controller hardware. The network switch 404 manages data flow between the I/O ports 430, 440 and the packet processing and cache controller hardware, and may be optimized for network traffic where it is desirable to obtain extremely low latency. The network switch 404 may be configured to concurrently accommodate a large number of independent accesses that are processed on each clock cycle, and enables communication data requests from network processor hardware to the cache hardware, as well as data responses from cache hardware to the network processor hardware. In one embodiment, network switch 404 includes logic (such as multiplexers or a switch fabric, for example) that allows any network processor to access any cache memory, and that conversely allows data to be returned from any cache memory to any network processor. Network switch 404 may also include logic to queue data requests and/or responses, such that requests and responses may not block other activity while waiting for service, and may be configured to arbitrate cache access conflicts.

The cache appliance hardware 400 also includes one or more network processor units (NPUs) which run the core software on the device to perform node management, cluster communication, packet processing, cache management, and client/filer communication. In a selected embodiment, two NPUs 406, 410 are provided, where each NPU may be implemented as a multi-threaded multi-core processor. To assist with device operation, each NPU 406, 410 controls a durable or non-volatile cache memory 408, 412, respectively. With the non-volatile cache memory units 408, 412, a very large amount of durable memory (e.g., 128 Gigabyte) may be provided for caching device operation software or data, such as with a field replaceable solid state drive (SSD) or hard disk drive (HDD) memory.

Finally, the cache appliance hardware 400 includes a substantial cache memory 416, 420 (e.g., 64-512 Gigabytes) for dynamically caching data files. To control the cache memory, the cache appliance hardware 400 includes a cache controller for each cache memory. In a selected embodiment, two cache controllers 414, 418 are provided, respectively, for each volatile cache memory 416, 420. Each cache controller 414, 418 is responsible for connecting both the dynamic cache memories 416, 420 and the non-volatile storage 408, 412 to the high-speed interconnect within the cache appliance 400. In addition, the cache controllers 414, 418 may offload some cache memory lookup and coherency functions from the network processors 406, 410.

To increase the caching capacity and performance of the data storage cache system, a cache appliance may be connected or clustered with one or more additional cache appliances on a private network so that the appliances work in tandem to form a single homogeneous caching device. As described above, each cache appliance 400 contains a set of network processing resources, dynamic storage, and non-volatile storage that are combined as a pool of resources which may be treated as a node on the network. To this end, each cache appliance 400 includes I/O ports 430, 440 that allow the cache appliance 400 to be connected to another cache appliance.

Figure 5:
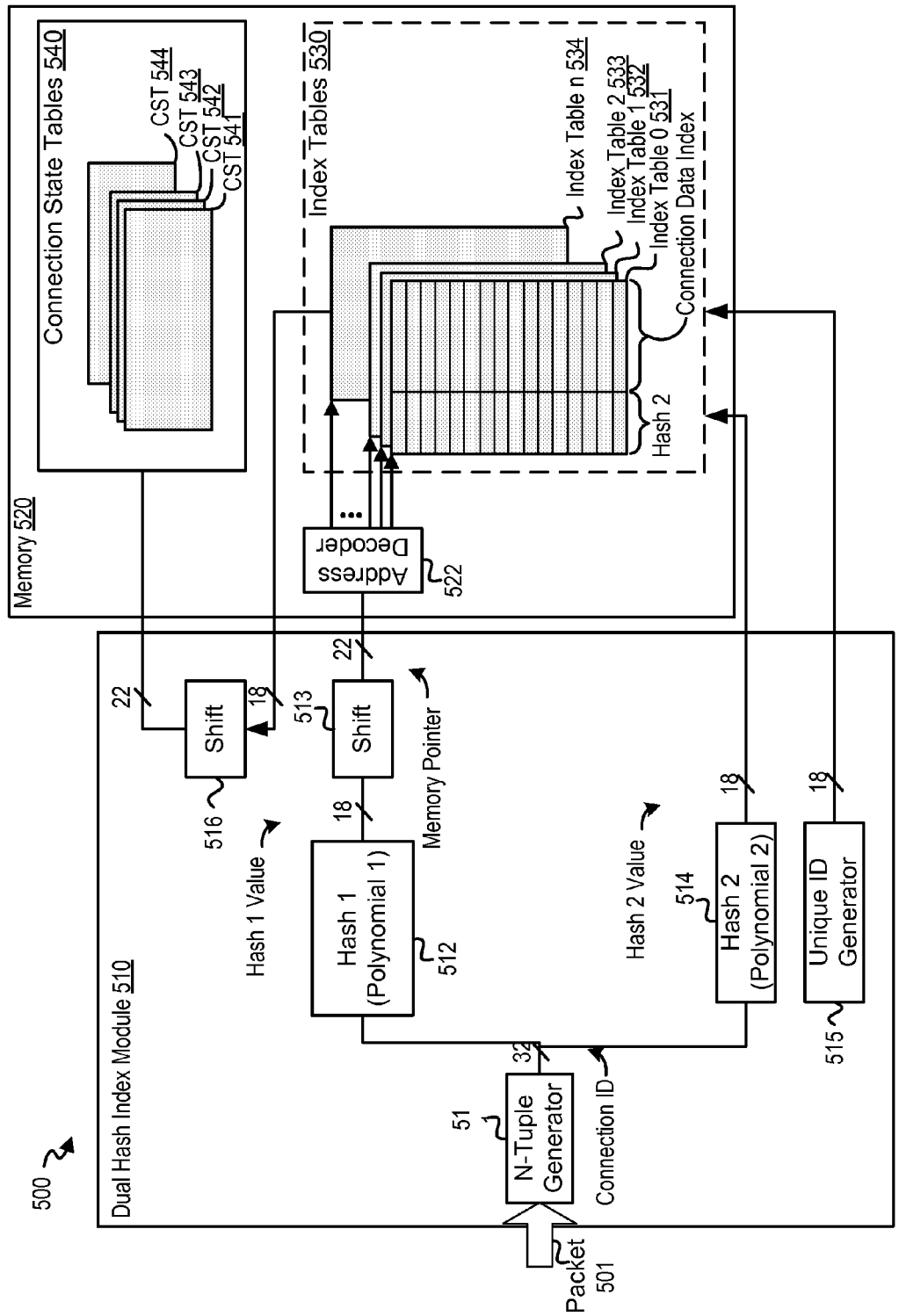
FIG. 5 depicts in simplified block form the design and operation of a dual hash indexing system for rapidly storing or retrieving information in accordance with an embodiment of the present invention.

To understand an example implementation of the present invention, reference is now made to FIG. 5 which depicts in simplified block form the design and operation of a dual hash indexing system 500 for rapidly storing or retrieving information for a received packet. The dual hash indexing system 500 includes a dual hash index module 510 and a memory 520. The depicted dual hash index module 510 may be implemented by the network packet processor or dedicated hardware circuitry to provide one or more of an n-tuple generator 511, a first hash engine/circuit 512, a second hash engine/circuit 514, a unique ID generator 515, a first shifter 513 and a second shifter 516. The memory 520 may be implemented with the cache memory which includes one or more address decoders 522 and stores index tables 530 and connection state tables 540. In operation, the dual hash index module 510 generates indexing and/or address values that are applied to retrieve or store connection state information in the memory 520. In the memory 520, the indexing and/or address values are applied to select one of the index tables 530 and output a connection data index value which is used to address or store one of the connection state tables 540 corresponding to the received packet.

For each received network packet 501, the dual hash index module 510 generates or assembles a connection identifier for the network packet which may include, for example, one or more predetermined fields from the packet header. In selected embodiments, the connection ID is generated by an n-tuple generator 511 which assembles at least the source IP address (SIP), destination IP address (DIP), source transport port (SP), and destination transport port (DP), though other packet segment fields may also be used, including but not limited to the virtual LAN (VLAN ID), the type, protocol, and MAC. While the size of the connection ID (e.g., 128 bits) formed by extracting the list or sequence of component values taken from the packet 501 is smaller than the packet size, it can be reduced further at the n-tuple generator 511 by applying a modular reduction function to the n-tuple. For example, a 32 bit connection ID may be generated by the n-tuple generator 511 so that Connection ID=f(n-tuple)mod32.

The dual hash index module 510 applies the generated connection ID to the first and second hash engine/circuits 512, 514 so that the connection ID for each packet is hashed to yield two hash values using, for example, two distinct irreducible Cyclical Redundancy Code hash functions. The specific hash functions implemented by the first and second hash circuits 512, 514 should be selected to reduce the probability that the permutation of input data bits from the connection ID generate identical results. For example, the first hash engine/circuit 512 can apply a first irreducible CRC polynomial hash function (Polynomial 1)=X0^X1^X13^X17^X18 to the received connection ID to generate a first, relatively small (e.g., 18 bit) hash value using the following example code sequence:

```
module CRC18_D32;
// polynomial: (0 1 13 17 18)
// data width: 32
// convention: the first serial data bit is D[31]
function [17:0] nextCRC18_D32;
    input [31:0] Data;
    input [17:0] CRC;
    reg [31:0] D;
    reg [17:0] C;
    reg [17:0] NewCRC;
begin
    D = Data;
    C = CRC;
    NewCRC[0] = D[30] ^ D[27] ^ D[26] ^ D[20] ^ D[19] ^ D[18] ^ D[17] ^
        D[16] ^ D[12] ^ D[11] ^ D[8] ^ D[6] ^ D[4] ^ D[3] ^
        D[2] ^ D[1] ^ D[0] ^ C[2] ^ C[3] ^ C[4] ^ C[5] ^ C[6] ^
        C[12] ^ C[13] ^ C[16];
    NewCRC[1] = D[31] ^ D[30] ^ D[28] ^ D[26] ^ D[21] ^ D[16] ^ D[13] ^
        D[11] ^ D[9] ^ D[8] ^ D[7] ^ D[6] ^ D[5] ^ D[0] ^ C[2] ^
        C[7] ^ C[12] ^ C[14] ^ C[16] ^ C[17];
    NewCRC[2] = D[31] ^ D[29] ^ D[27] ^ D[22] ^ D[17] ^ D[14] ^ D[12] ^
        D[10] ^ D[9] ^ D[8] ^ D[7] ^ D[6] ^ D[1] ^ C[0] ^ C[3] ^
        C[8] ^ C[13] ^ C[15] ^ C[17];
    NewCRC[3] = D[30] ^ D[28] ^ D[23] ^ D[18] ^ D[15] ^ D[13] ^ D[11] ^
        D[10] ^ D[9] ^ D[8] ^ D[7] ^ D[2] ^ C[1] ^ C[4] ^ C[9] ^
        C[14] ^ C[16];
    NewCRC[4] = D[31] ^ D[29] ^ D[24] ^ D[19] ^ D[16] ^ D[14] ^ D[12] ^
        D[11] ^ D[10] ^ D[9] ^ D[8] ^ D[3] ^ C[0] ^ C[2] ^
        C[5] ^ C[10] ^ C[15] ^ C[17];
    NewCRC[5] = D[30] ^ D[25] ^ D[20] ^ D[17] ^ D[15] ^ D[13] ^ D[12] ^
        D[11] ^ D[10] ^ D[9] ^ D[4] ^ C[1] ^ C[3] ^ C[6] ^
        C[11] ^ C[16];
    NewCRC[6] = D[31] ^ D[26] ^ D[21] ^ D[18] ^ D[16] ^ D[14] ^ D[13] ^
        D[12] ^ D[11] ^ D[10] ^ D[5] ^ C[0] ^ C[2] ^ C[4] ^
        C[7] ^ C[12] ^ C[17];
    NewCRC[7] = D[27] ^ D[22] ^ D[19] ^ D[17] ^ D[15] ^ D[14] ^ D[13] ^
        D[12] ^ D[11] ^ D[6] ^ C[0] ^ C[1] ^ C[3] ^ C[5] ^
        C[8] ^ C[13];
    NewCRC[8] = D[28] ^ D[23] ^ D[20] ^ D[18] ^ D[16] ^ D[15] ^ D[14] ^
        D[13] ^ D[12] ^ D[7] ^ C[0] ^ C[1] ^ C[2] ^ C[4] ^
        C[6] ^ C[9] ^ C[14];
    NewCRC[9] = D[29] ^ D[24] ^ D[21] ^ D[19] ^ D[17] ^ D[16] ^ D[15] ^
        D[14] ^ D[13] ^ D[8] ^ C[0] ^ C[1] ^ C[2] ^ C[3] ^
        C[5] ^ C[7] ^ C[10] ^ C[15];
    NewCRC[10] = D[30] ^ D[25] ^ D[22] ^ D[20] ^ D[18] ^ D[17] ^
        D[16] ^ D[15] ^ D[14] ^ D[9] ^ C[0] ^ C[1] ^ C[2] ^ C[3] ^
        C[4] ^ C[6] ^ C[8] ^ C[11] ^ C[16];
    NewCRC[11] = D[31] ^ D[26] ^ D[23] ^ D[21] ^ D[19] ^ D[18] ^
        D[17] ^ D[16] ^ D[15] ^ D[10] ^ C[1] ^ C[2] ^ C[3] ^ C[4] ^
        C[5] ^ C[7] ^ C[9] ^ C[12] ^ C[17];
    NewCRC[12] = D[27] ^ D[24] ^ D[22] ^ D[20] ^ D[19] ^ D[18] ^
        D[17] ^ D[16] ^ D[11] ^ C[2] ^ C[3] ^ C[4] ^ C[5] ^ C[6] ^
        C[8] ^ C[10] ^ C[13];
    NewCRC[13] = D[30] ^ D[28] ^ D[27] ^ D[26] ^ D[25] ^ D[23] ^
        D[21] ^ D[16] ^ D[11] ^ D[8] ^ D[6] ^ D[4] ^ D[3] ^ D[2] ^
        D[1] ^ D[0] ^ C[2] ^ C[7] ^ C[9] ^ C[11] ^ C[12] ^
        C[13] ^ C[14] ^ C[16];
    NewCRC[14] = D[31] ^ D[29] ^ D[28] ^ D[27] ^ D[26] ^ D[24] ^
        D[22] ^ D[17] ^ D[12] ^ D[9] ^ D[7] ^ D[5] ^ D[4] ^ D[3] ^
        D[2] ^ D[1] ^ C[3] ^ C[8] ^ C[10] ^ C[12] ^ C[13] ^
        C[14] ^ C[15] ^ C[17];
    NewCRC[15] = D[30] ^ D[29] ^ D[28] ^ D[27] ^ D[25] ^ D[23] ^
        D[18] ^ D[13] ^ D[10] ^ D[8] ^ D[6] ^ D[5] ^ D[4] ^ D[3] ^
        D[2] ^ C[4] ^ C[9] ^ C[11] ^ C[13] ^ C[14] ^ C[15] ^
        C[16];
    NewCRC[16] = D[31] ^ D[30] ^ D[29] ^ D[28] ^ D[26] ^ D[24] ^
        D[19] ^ D[14] ^ D[11] ^ D[9] ^ D[7] ^ D[6] ^ D[5] ^ D[4] ^
        D[3] ^ C[0] ^ C[5] ^ C[10] ^ C[12] ^ C[14] ^ C[15] ^
        C[16] ^ C[17];
    NewCRC[17] = D[31] ^ D[29] ^ D[26] ^ D[25] ^ D[19] ^ D[18] ^
        D[17] ^ D[16] ^ D[15] ^ D[11] ^ D[10] ^ D[7] ^ D[5] ^ D[3] ^
        D[2] ^ D[1] ^ D[0] ^ C[1] ^ C[2] ^ C[3] ^ C[4] ^ C[5] ^
        C[11] ^ C[12] ^ C[15] ^ C[17];
    nextCRC18_D32 = NewCRC;
end
endfunction
endmodule
```

Continuing with the example, the second hash engine/circuit 514 can apply a second irreducible CRC polynomial hash function (Polynomial 2)=X0^X1^X3^X5^X7^X17^X18 to the received connection ID to generate a second, relatively small (e.g., 18 bit) hash value using the following example code sequence:

```
module CRC18_D32;
// polynomial: (0 1 3 5 7 17 18)
// data width: 32
// convention: the first serial data bit is D[31]
function [17:0] nextCRC18_D32;
    input [31:0] Data;
    input [17:0] CRC;
    reg [31:0] D;
    reg [17:0] C;
    reg [17:0] NewCRC;
begin
    D = Data;
    C = CRC;
    NewCRC[0] = D[30] ^ D[29] ^ D[27] ^ D[25] ^ D[22] ^ D[21] ^ D[19] ^
        D[17] ^ D[16] ^ D[14] ^ D[13] ^ D[12] ^ D[10] ^ D[9] ^
        D[8] ^ D[7] ^ D[6] ^ D[5] ^ D[4] ^ D[3] ^ D[2] ^ D[1] ^
        D[0] ^ C[0] ^ C[2] ^ C[3] ^ C[5] ^ C[7] ^ C[8] ^ C[11] ^
        C[13] ^ C[15] ^ C[16];
    NewCRC[1] = D[31] ^ D[29] ^ D[28] ^ D[27] ^ D[26] ^ D[25] ^ D[23] ^
        D[21] ^ D[20] ^ D[19] ^ D[18] ^ D[16] ^ D[15] ^ D[12] ^
        D[11] ^ D[0] ^ C[1] ^ C[2] ^ C[4] ^ C[5] ^ C[6] ^ C[7] ^
        C[9] ^ C[11] ^ C[12] ^ C[13] ^ C[14] ^ C[15] ^ C[17];
    NewCRC[2] = D[30] ^ D[29] ^ D[28] ^ D[27] ^ D[26] ^ D[24] ^ D[22] ^
        D[21] ^ D[20] ^ D[19] ^ D[17] ^ D[16] ^ D[13] ^ D[12] ^
        D[1] ^ C[2] ^ C[3] ^ C[5] ^ C[6] ^ C[7] ^ C[8] ^ C[10] ^
        C[12] ^ C[13] ^ C[14] ^ C[15] ^ C[16];
    NewCRC[3] = D[31] ^ D[28] ^ D[23] ^ D[20] ^ D[19] ^ D[18] ^ D[16] ^
        D[12] ^ D[10] ^ D[9] ^ D[8] ^ D[7] ^ D[6] ^ D[5] ^
        D[4] ^ D[3] ^ D[1] ^ D[0] ^ C[2] ^ C[4] ^ C[5] ^ C[6] ^
        C[9] ^ C[14] ^ C[17];
    NewCRC[4] = D[29] ^ D[24] ^ D[21] ^ D[20] ^ D[19] ^ D[17] ^ D[13] ^
        D[11] ^ D[10] ^ D[9] ^ D[8] ^ D[7] ^ D[6] ^ D[5] ^
        D[4] ^ D[2] ^ D[1] ^ C[3] ^ C[5] ^ C[6] ^ C[7] ^ C[10] ^
        C[15];
    NewCRC[5] = D[29] ^ D[27] ^ D[20] ^ D[19] ^ D[18] ^ D[17] ^ D[16] ^
        D[13] ^ D[11] ^ D[4] ^ D[1] ^ D[0] ^ C[2] ^ C[3] ^
        C[4] ^ C[5] ^ C[6] ^ C[13] ^ C[15];
    NewCRC[6] = D[30] ^ D[28] ^ D[21] ^ D[20] ^ D[19] ^ D[18] ^ D[17] ^
        D[14] ^ D[12] ^ D[5] ^ D[2] ^ D[1] ^ C[0] ^ C[3] ^
        C[4] ^ C[5] ^ C[6] ^ C[7] ^ C[14] ^ C[16];
    NewCRC[7] = D[31] ^ D[30] ^ D[27] ^ D[25] ^ D[20] ^ D[18] ^ D[17] ^
        D[16] ^ D[15] ^ D[14] ^ D[12] ^ D[10] ^ D[9] ^ D[8] ^
        D[7] ^ D[5] ^ D[4] ^ D[1] ^ D[0] ^ C[0] ^ C[1] ^ C[2] ^
        C[3] ^ C[4] ^ C[6] ^ C[11] ^ C[13] ^ C[16] ^ C[17];
    NewCRC[8] = D[31] ^ D[28] ^ D[26] ^ D[21] ^ D[19] ^ D[18] ^ D[17] ^
        D[16] ^ D[15] ^ D[13] ^ D[11] ^ D[10] ^ D[9] ^ D[8] ^
        D[6] ^ D[5] ^ D[2] ^ D[1] ^ C[1] ^ C[2] ^ C[3] ^ C[4] ^
        C[5] ^ C[7] ^ C[12] ^ C[14] ^ C[17];
    NewCRC[9] = D[29] ^ D[27] ^ D[22] ^ D[20] ^ D[19] ^ D[18] ^ D[17] ^
        D[16] ^ D[14] ^ D[12] ^ D[11] ^ D[10] ^ D[9] ^ D[7] ^
        D[6] ^ D[3] ^ D[2] ^ C[0] ^ C[2] ^ C[3] ^ C[4] ^ C[5] ^
        C[6] ^ C[8] ^ C[13] ^ C[15];
    NewCRC[10] = D[30] ^ D[28] ^ D[23] ^ D[21] ^ D[20] ^ D[19] ^
        D[18] ^ D[17] ^ D[15] ^ D[13] ^ D[12] ^ D[11] ^ D[10] ^ D[8] ^
        D[7] ^ D[4] ^ D[3] ^ C[1] ^ C[3] ^ C[4] ^ C[5] ^ C[6] ^
        C[7] ^ C[9] ^ C[14] ^ C[16];
    NewCRC[11] = D[31] ^ D[29] ^ D[24] ^ D[22] ^ D[21] ^ D[20] ^
        D[19] ^ D[18] ^ D[16] ^ D[14] ^ D[13] ^ D[12] ^ D[11] ^ D[9] ^
        D[8] ^ D[5] ^ D[4] ^ C[0] ^ C[2] ^ C[4] ^ C[5] ^ C[6] ^
        C[7] ^ C[8] ^ C[10] ^ C[15] ^ C[17];
    NewCRC[12] = D[30] ^ D[25] ^ D[23] ^ D[22] ^ D[21] ^ D[20] ^
        D[19] ^ D[17] ^ D[15] ^ D[14] ^ D[13] ^ D[12] ^ D[10] ^ D[9] ^
        D[6] ^ D[5] ^ C[0] ^ C[1] ^ C[3] ^ C[5] ^ C[6] ^ C[7] ^
        C[8] ^ C[9] ^ C[11] ^ C[16];
    NewCRC[13] = D[31] ^ D[26] ^ D[24] ^ D[23] ^ D[22] ^ D[21] ^
        D[20] ^ D[18] ^ D[16] ^ D[15] ^ D[14] ^ D[13] ^ D[11] ^ D[10] ^
        D[7] ^ D[6] ^ C[0] ^ C[1] ^ C[2] ^ C[4] ^ C[6] ^ C[7] ^
        C[8] ^ C[9] ^ C[10] ^ C[12] ^ C[17];
    NewCRC[14] = D[27] ^ D[25] ^ D[24] ^ D[23] ^ D[22] ^ D[21] ^
        D[19] ^ D[17] ^ D[16] ^ D[15] ^ D[14] ^ D[12] ^ D[11] ^ D[8] ^
        D[7] ^ C[0] ^ C[1] ^ C[2] ^ C[3] ^ C[5] ^ C[7] ^ C[8] ^
        C[9] ^ C[10] ^ C[11] ^ C[13];
    NewCRC[15] = D[28] ^ D[26] ^ D[25] ^ D[24] ^ D[23] ^ D[22] ^
        D[20] ^ D[18] ^ D[17] ^ D[16] ^ D[15] ^ D[13] ^ D[12] ^ D[9] ^
        D[8] ^ C[1] ^ C[2] ^ C[3] ^ C[4] ^ C[6] ^ C[8] ^ C[9] ^
        C[10] ^ C[11] ^ C[12] ^ C[14];
    NewCRC[16] = D[29] ^ D[27] ^ D[26] ^ D[25] ^ D[24] ^ D[23] ^
        D[21] ^ D[19] ^ D[18] ^ D[17] ^ D[16] ^ D[14] ^ D[13] ^ D[10] ^
        D[9] ^ C[0] ^ C[2] ^ C[3] ^ C[4] ^ C[5] ^ C[7] ^ C[9] ^
        C[10] ^ C[11] ^ C[12] ^ C[13] ^ C[15];
    NewCRC[17] = D[29] ^ D[28] ^ D[26] ^ D[24] ^ D[21] ^ D[20] ^
        D[18] ^ D[16] ^ D[15] ^ D[13] ^ D[12] ^ D[11] ^ D[9] ^ D[8] ^
        D[7] ^ D[6] ^ D[5] ^ D[4] ^ D[3] ^ D[2] ^ D[1] ^ D[0] ^
        C[1] ^ C[2] ^ C[4] ^ C[6] ^ C[7] ^ C[10] ^ C[12] ^
        C[14] ^ C[15];
    nextCRC18_D32 = NewCRC;
end
endfunction
endmodule
```

As these example code sequences demonstrate, the polynomial hash functions for the first and second hash engine/circuits 512, 514 should be selected so that they are irreducible and/or so that no other term permutation, X0 to Xn-1 would generate the same result. The proper selection of the hash functions reduces the probability that the permutation of input data bits by the n-tuple generator 511 will generate identical results.

In the dual hash index module 510, the first hash value generated by the first hash engine/circuit 512 is used to generate a memory pointer to one of the index tables 530. However, rather than using the first hash value to directly access the connection state information for the packet from the index table (which can result in collisions between different connections), a first shift circuit 513 is used to shift the first hash value by a predetermined number of bit positions to address a multi-entry index table 530 in memory 520 where the number of entries in the addressed index table corresponds to the number of shifted bit positions. For example, if the first shift circuit 513 shifts the first 18-bit hash value by four bit positions, then the shifted first hash value is 22 bits long, and can be applied to the address decoder 522 to address one of the index tables 530 which has sixteen ($2^4$) entries. In the addressed index table 530, the second hash value is stored in one of the entries as an index value or key, along with an output from the unique ID generator 515 which provides a pointer or index to the location in the memory 520 of the corresponding connection state table 540. Thus, when a first index table 531 is addressed by a shifted first hash value (Hash 1) that is generated from a first connection ID, the entries in the first index table 531 are used to store the second hash values (Hash 2) for those connections that would otherwise result in a collision. Likewise, a second index table 532 is addressed by a shifted first hash value (Hash 1) that is generated from a second connection ID, and the entries in the second index table 532 are used to store the second hash values (Hash 2) for those connections that would otherwise result in a collision. And so on for the remaining index tables 533, 534, etc., so that an addressable index table is created in memory 520 for each possible value for the shifted first hash value.

As for populating the initially empty index table entries for connections cached at the cache appliance, the first and second hash algorithms are chosen so that the second hash values generated from the connection IDs that point to a given index table (e.g., first index table 531) are effectively guaranteed to be unique from one another. As a result, for each connection ID having a first hash value that points to the first index table 531, the corresponding second hash value is stored in an entry in first index table 531 as a key or index value. At the same time, the unique ID generator 515 generates a connection data index value that is stored in the same index table entry as an output value. The unique ID generator 515 can use a variety of different techniques to generate unique ID values, including but not limited to using a FIFO circuit or another hash circuit/ engine to generate unique values for each index table entry. However generated, the unique ID value stored in the index table is used to generate a memory pointer or address for the connection state table corresponding to the cached connection data. If the stored unique ID is the actual memory address for the connection state table, then the unique ID generator 515 will need to generate memory addresses that are separated from one another sufficiently to allow a connection state table to be store between adjacent memory addresses. Alternatively, a second shift circuit 516 may be used generate the memory pointer by shifting the unique ID value by a predetermined number of bit positions to address the location in memory 520 for the connection state table, where the size of the connection state table is controlled by the number of shifted bit positions. For example, if the second shift circuit 516 shifts an 18-bit unique ID value by four bit positions, then the shifted unique ID value is 22 bits long, and can be applied to address one of the connection state tables 540 (e.g., connection state table 541), where each connection state table stores sixteen entries, each storing 4×shift=16 bytes in a 32-bit system, or 8×shift=32 bytes in a 64-bit system. Of course, with more shifts, larger connection state tables can be indexed. Thus, a six-bit position shift by the second shift circuit 516 generates a shifted unique ID value that can be applied to address one of the connection state tables 540, where each connection state table stores sixty-four entries, each storing 256 bytes in a 32-bit system.

By storing unique ID values as connection data index values in the entries of the index tables 531-534, each index table output uniquely addresses one of the connection state tables 540. Thus, a first unique ID value that is output from a first index table (e.g., 531) uniquely identifies one of the connection state tables (e.g., CST 541), while a second unique ID value that is output from the first index table 531 uniquely identifies a different connection state table (e.g., CST 542), and a third unique ID value that is output from another index table (e.g., 534) uniquely identifies yet another connection state table (e.g., CST 543), and so on. In this way, each connection state table 541-544 that is maintained for the cached connections in the cache appliance has a unique ID value stored in the index tables 530.

When applied to a network having one million connections, empirical testing has shown that fewer collisions result when an 18+4 bit hash value is used to indirectly address the connection state information, as compared to using a 22-bit hash value to directly address connection state table information. This likely results from the fact that there are no more than sixteen (and more specifically 12) connection IDs that will generate collisions with the first 18-bit hash value. Another advantage of using an 18+4 bit hash to address the index tables is that the 22-bit addressing scheme works well with the physical memory addressing limitations to address four million ($2^{22}$) index tables 530. Likewise, the 22-bit addressing scheme for accessing the connection state tables 540 allows the connection state tables and corresponding cached data to be stored in the cache memory 520. For example, 128 GB of memory 520 can store four million ($2^{22}$) blocks of cached data when each cache data block size is 32 KB, while 1 GB of memory 520 can store one million connection table entries when each connection table entry size is 1 KB. However, it will be appreciated the performance of the dual hash indexing scheme can be adjusted with different network configurations. For example, smaller hash values can be used when there are fewer connections to track in a network, while larger hash values can be used when there are more connections to track.

Figure 6:
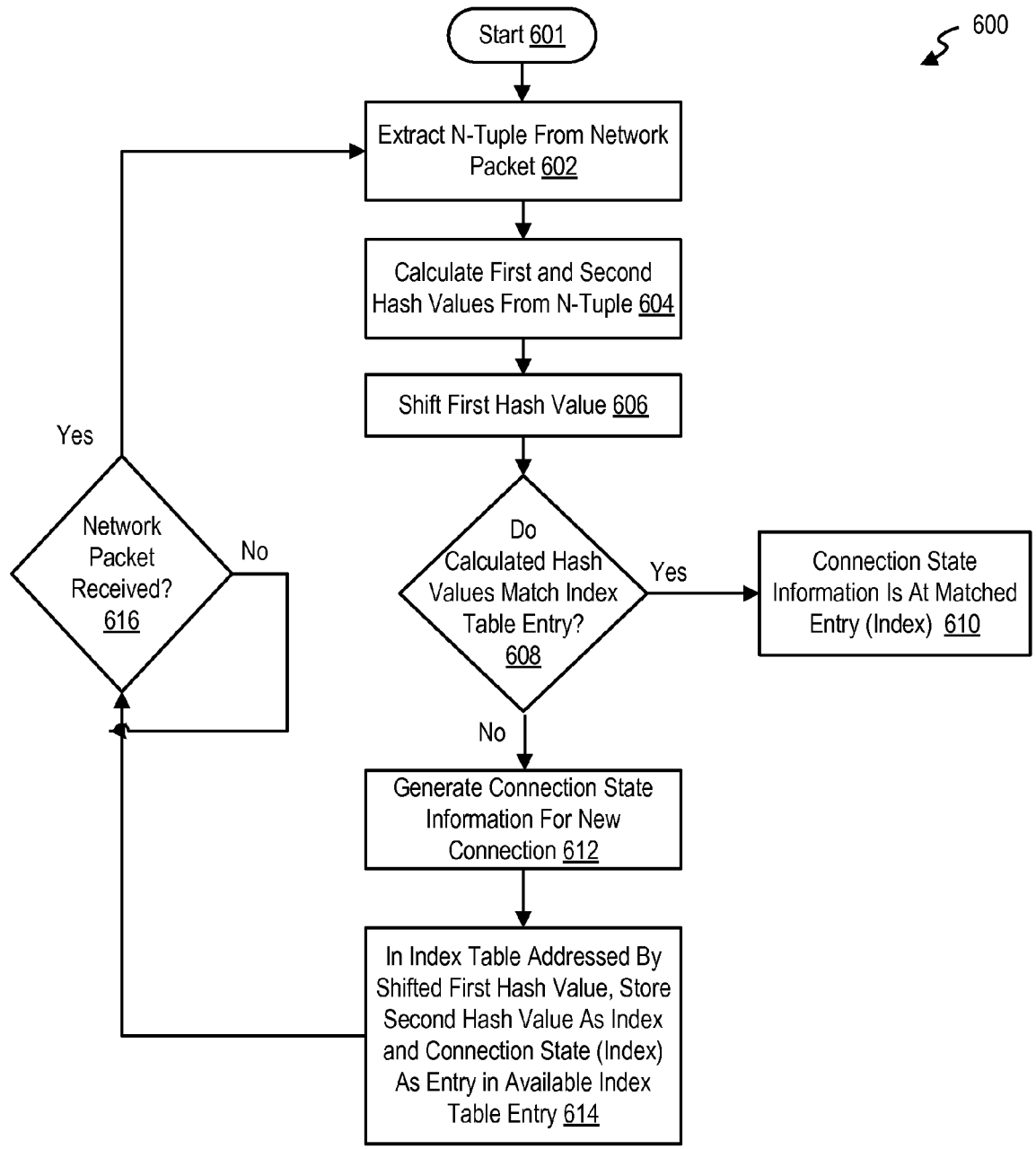
FIG. 6 depicts an example process flow sequence for identifying and storing connection state information using a dual hash indexing scheme in accordance with an embodiment of the present invention.

Turning now to FIG. 6, selected embodiments of the present invention may be more generally understood with reference to the depicted example flow methodology 600 for identifying and storing connection state information using a dual hash indexing scheme in accordance with selected embodiments of the present invention. The process starts (step 601) when a network packet is received. The packet is inspected by extracting an n-tuple (step 602) that uniquely identifies a connection between a client and filer. While various transport parameters from the packet header (e.g., SIP, DIP, SP, DP, MAC, Type, Protocol and VLAN) can be used to generate the n-tuple, other NFS parameters may also be used, such as the filer ID, filer handler, file ID, filer allocation table index, etc.

First and second hash values are then calculated from the extracted n-tuple (step 604) using two irreducible CRC hash algorithms which each compress the n-tuple to a smaller value. For example, two irreducible polynomial hash algorithms may be applied to the n-tuple to generate two CRC 18-bit hash values. As disclosed herein, the selected polynomial hash algorithms should be irreducible, or at least should be selected so that no other term permutation, $X_0$ to $X_{n-1}$, will generate the same first and second hash value results. At a minimum, the selection of the polynomial hash algorithms should reduce the probability that the permutation of input data bits will generate identical results.

The first calculated hash value is used to produce a pointer by shifting the first hash value a predetermined number of spaces (step 606). In an example implementation, the 18-bit first hash value is left-shifted four positions to create a 22-bit address for a 16-entry index table. Each entry in the addressed index table corresponds to a cached connection, and includes a second hash value which is used to index a unique ID value in the addressed index table that points to a connection state table for a cached connection. As a result, if the calculated first and second hash values for a given connection ID match an index table entry (affirmative outcome to decision 608), the connection is a cached connection, and the corresponding connection state information can be retrieved by using the unique ID value from the matched entry to generate the memory location for the connection state information (step 610). Alternatively, the corresponding connection state information can be retrieved directly from the matched index table entry if stored therein.

On the other hand, if the calculated first and second hash values for a given connection ID do not match an index table entry (negative outcome to decision 608) and the connection is to be cached in the cache appliance, the connection is a new connection that must be stored in the cache memory along with connection state information. To this end, connection state information for the new connection is generated (step 612), and the appropriate index table is populated with the second hash value and connection state index information (step 614). In particular, the index table addressed by the shifted first hash value is used to store the second hash value as an index in an available entry. In that same index table entry, a pointer or index is stored which identifies the location in memory where the new connection state information is stored, or alternatively, the connection state information itself is stored. In this way, subsequent requests for the same connection can quickly retrieve the corresponding connection state information using only one or two table search operations. This is indicated at step 616, where a wait state is entered (negative outcome to decision 616) until another packet is received (affirmative outcome to decision 616), at which point the sequence of steps is repeated.

Figure 7:
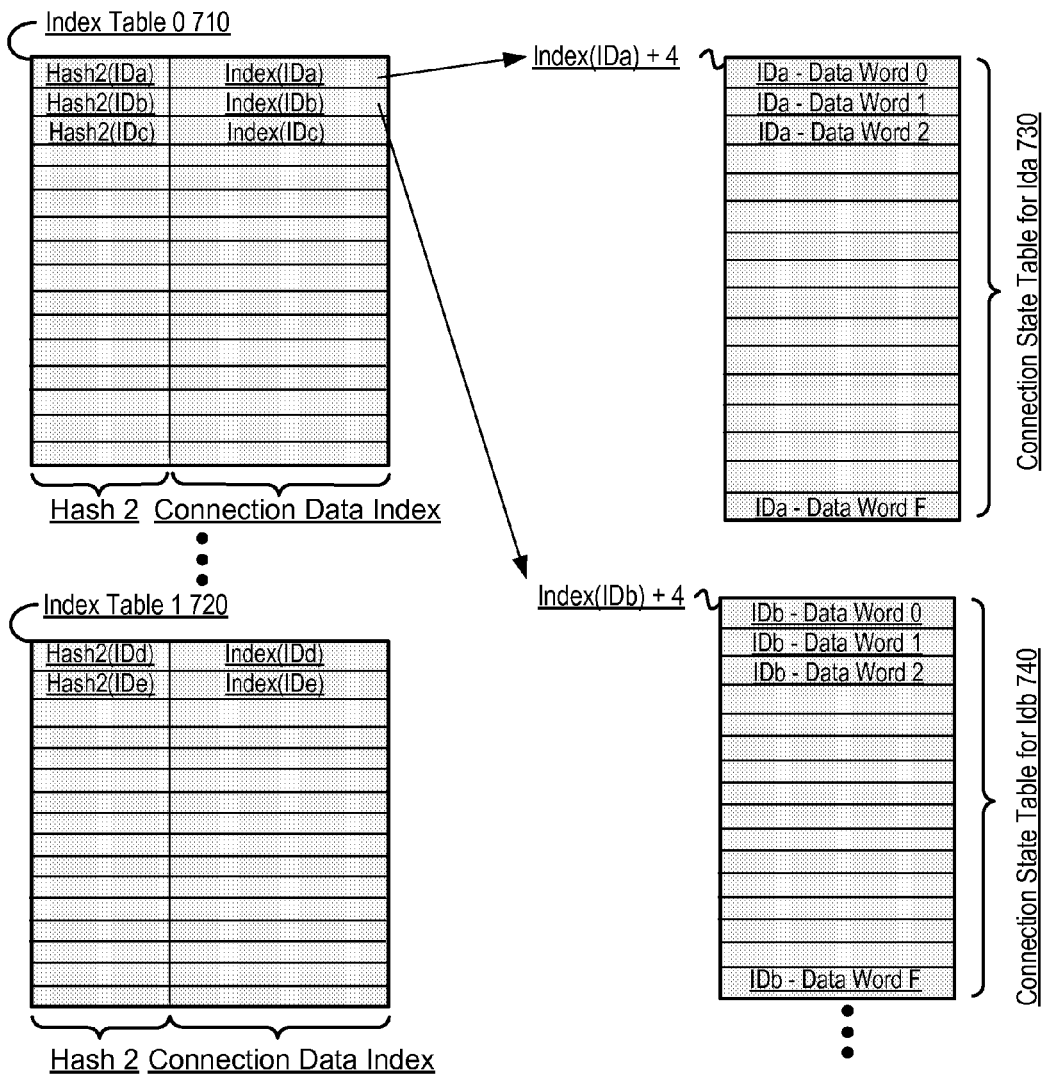
FIG. 7 depicts an example memory allocation for storing connection state tables in memory using the dual hash index scheme in accordance with selected embodiments of the present invention.

To illustrate how connection state tables are allocated in memory using the dual hash index scheme in accordance with selected embodiments of the present invention, reference is made to FIG. 7 which depicts the processing of example packets a-f 701-706. As shown, each packet (e.g., packet a) includes one or more identification parameters (e.g., IDa) which can be extracted to identify the connection. The remaining packets b-f also have identification parameters IDb-IDf. The extracted parameters for each packet are used to generate two hash values (e.g., Hash1(IDa) and Hash2(IDa)), where the first hash value (e.g., Hash1(IDa)) is shifted four positions to provide memory pointer for an index table (e.g., Index Table 0) in which the second hash value (e.g., Hash2(IDa)) is stored in an available entry along with a unique index value (e.g., Index(IDa)) for the packet if it has not been previously stored. With the example packets a-f shown in FIG. 7, the first hash values for packets a-c all point to a first index table, namely Index Table 0 710, and the second hash values for packets a-c are stored in separate entries of the first index table 710. Thus, when the first packet 701 is first received and cached in the cache appliance, the second hash value Hash2(IDa) and a corresponding connection data index value Index(IDa) are stored in a first entry of the addressed index table 0 710. Likewise, when the second packet 702 is first received and cached, the second hash value Hash2(IDb) and a corresponding connection data index value Index(IDb) are stored in a second entry of the addressed index table 0 710, and when the third packet 703 is first received and cached, the second hash value Hash2(IDc) and a corresponding connection data index value Index(IDc) are stored in a third entry of the addressed index table 0 710. By storing the second hash values as indices to the index table 0 710, the corresponding connection data index values can be output and shifted to locate the corresponding connection state table. This is illustrated in FIG. 7 where the unique index value Index(IDa) stored in the first entry of the index table 0 710 is shifted to address the connection state table 730 which stores the connection state information for connection IDa as one or more data words (e.g., data words 0-F). However, the second entry in the index table 0 710 stores the unique index value Index (IDb) for the second packet 702 which is shifted to address the connection state table 740 which stores the connection state table for connection IDb as one or more data words (e.g., data words 0-F).

As shown in FIG. 7, the first hash values for packets d-e point to another index table, namely Index Table 1 720. As a result, the second hash values corresponding to packets d-e are stored in the second index table 720. Thus, when the fourth packet 704 is first received and cached in the cache appliance, the second hash value Hash2(IDd) and a corresponding connection data index value Index(IDd) are stored in a first entry of the addressed index table 1 720, and when the fifth packet 705 is first received and cached, the second hash value Hash2(IDe) and a corresponding connection data index value Index(IDe) are stored in a second entry of the addressed index table 1 720. Though not shown in FIG. 7, the stored unique index values stored in the index table 1 720 are also output and shifted to address the connection state tables which store the connection state information corresponding to connection IDd and IDe as one or more data words (e.g., data words 0-F).

With this dual hash indexing scheme, any subsequently received packet that is part of a previously stored connection can be quickly retrieved and processed. For example, if a subsequent packet 706 is received that belongs to the same connection as the first packet 701, the packets 701, 706 will have the same identification parameters. As a result, when the first hash value from the subsequent packet 706 (e.g., Hash1 (IDf)) is generated and shifted four positions, it will provide a memory pointer to the index table (e.g., Index Table 0), and the calculated second hash value Hash2(IDf) will match the previously stored second hash value Hash2(IDa), thereby indicating the memory address location for the connection state table for the packet 706 is stored in matching first entry from the first index table 710, namely Index(IDa)+4.

Figure 8:
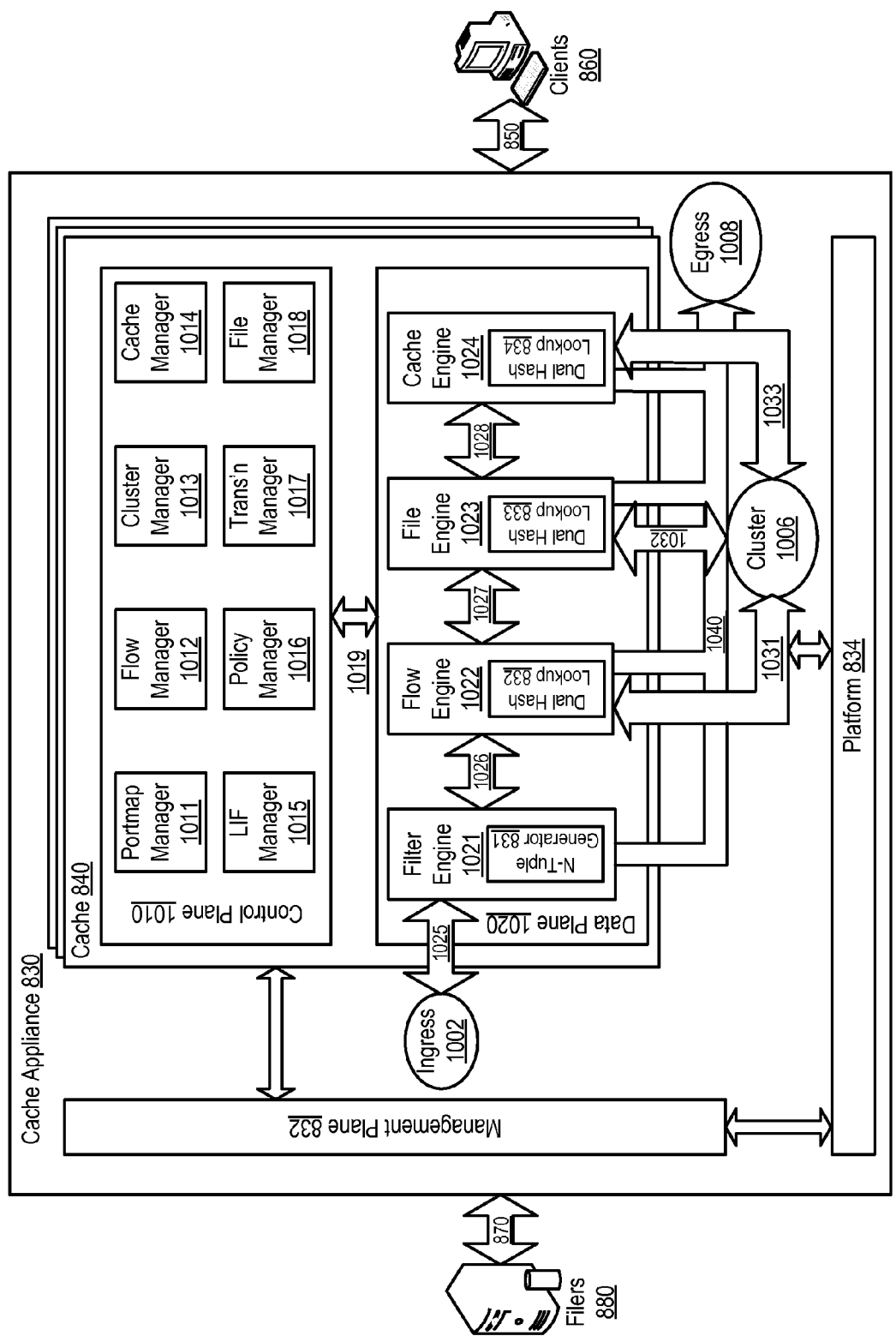
FIG. 8 depicts the overall system architecture of a non-disruptive storage cache appliance to show how the control plane and data plane interact to process an incoming data request.

To illustrate the constituent component functionality of the cache appliance, reference is made to FIG. 8 which depicts the overall system architecture of a non-disruptive storage cache appliance 830 which is configured to receive and process packets from the clients 860 and filers 880 that are sent over the connection interfaces 850, 870. The depicted architecture of the cache appliance 830 is divided into three logical components, including the platform component 834, the cache component(s) 840, and the systems management component 832.

The platform component 834 includes the hardware and system software components that come together to form the basis of the system. As described hereinabove, the hardware in the platform component 834 includes the individual cache appliance (described above with reference to FIG. 4) which provides network interfaces, packet processing and cache memory. In selected embodiments, more than one cache component 840 may be connected together in a cluster using the cluster interface 1006. The software in the platform component 834 includes a boot loader component (for bringing the appliance to a minimal operating state), an operating system component (to provide for process scheduling, memory allocation, network, and flash file system facilities) and drivers (for extending the OS functionality and provide access to required hardware).

The cache component 840 includes the embedded software that runs on the cache appliance to implement the caching functionality on the appliance 830. By having the cache appliance 830 servicing I/O requests from the cache 840, responses to clients 860 are accelerated. When the cache component 840 is architected as a shared-nothing system, every piece of file data within the cache memory is found in one and only one memory location and the data is in no way replicated in the system. The cache 840 locates its data using the dual hash indexing scheme described herein which guarantees that the location of the data is unique and deterministic, and which computes the location of a block of data at a fixed processing cost (e.g., one or two search cycles). As illustrated, the cache component software 840 includes a data plane section 1020 which performs the required packet processing functions on a packet so that each packet can progress through the cache appliance 830. In other words, if something must be performed to progress a packet through the system, then it is a data plane activity. The data plane 1020 processes received client and filer traffic through a pipeline of operations. At any point during the processing, the data plane 1020 may forward a packet out from the cache component 840 because it is finished servicing the operation, or the packet is not pertinent to the system, or for other reasons.

The cache component software 840 also includes a control plane section 1010 which performs the required processing functions about a packet to facilitate the data plane or that is not required in order to process a packet. In other words, the control plane section 1010 stores control information that affects the data plane 1020. If any stimulus outside of a packet traversing the system requires an operation, then it is a control plane activity. The control plane 1010 is composed of stand-alone data structures as well as a set of managers that themselves may contain their own data structures. The interaction between the control plane 1010 and the data plane 1020 is via the interface 1019 which can be take several forms, such as function calls, IPC requests, or direct access into a data structure's memory. As packets progress through the system, the data plane 1020 queries the control plane 1010 to help it perform its operations. The data plane 1020 conversely sends information to the control plane 1010 that it may either need in subsequent operations or that provide information to the management functions of the system. In addition, the cache component software 840 includes a management plane section 832 which performs various ancillary functions on the system that do not affect the processing of packets or that is on demand from a remote management server.

In operation, the data plane 1020 includes a packet filter engine 1021 that inspects received packets to identify the packets that need to be processed by the cache appliance 830, and forwards all other packets to an exit interface 850, 870. This action minimizes the impact of non-relevant packets on system resources. There are two types of packets that must be identified for further processing: cache appliance IPC packets and client/filer packets. Cache appliance IPC packets are identified based on L2 headers and knowledge of how such packets are formatted (e.g., custom Ethernet types). Client/filer packets are identified based on L2-L4 headers and queries to the port map manager which contains information about the UDP/TCP ports being used by the filers to provide storage services (NFS, CIFS, etc.). The information gleaned from L2-L4 parsing is saved in the packet context to avoid having to parse these headers again in other components.

The data plane 1020 also includes a flow engine 1022 to process TCP connections and UDP conversations by providing a place to store flow context and to implement split TCP connections and flow serialization, where a flow refers to a sequence of TCP or UDP packets having with the same 5-tuple. The flow engine provides a mechanism for other modules to store flow-specific data for later retrieval. For example, the NFS module may store data related to an NFS request to match with an ensuing NFS reply. Another primary example is TCP connection state for tracking sequence numbers, retransmits, etc. As from implementing split TCP connections, this occurs when the cache appliance 830 becomes a man-in-the-middle on a connection when a request (e.g., an NFS read) is intercepted and served from local cache. The flow manager implements the logic needed to be a man-in-the-middle on a split connection.

A file engine 1023 in the data plane 1020 handles layer 5-7 NFS, mount, CIFS, HTTP, FTP, and port mapper transactions that are used to perform protocol decode, file lookup, and transaction processing operations. In protocol decode operations, the protocol messages are delineated and decoded based on a protocol content type that is determined by the flow engine. After decode, a file lookup operation is performed using a reverse lookup of the internal file record based on filer and a protocol-specific file reference. This provides the file-specific information needed to process the message (e.g., internal file handle, cache policy, etc). In transaction processing operations, the requests are tracked and correlated with corresponding responses as part of a transaction pair between a client request and filer response, and based on the transaction type, the completed transaction pairs are routed to the appropriate component for further processing. For example, client requests for cacheable objects are intercepted and passed to the appropriate component (data requests to the cache engine), and all the information necessary to complete the transaction is passed on (packet, packet context, file record, request, etc.).

Finally, the data plane 1020 includes a cache engine 1024 that provides fault-tolerant block-level file caching. File requests are translated into cache block accesses. A cache block is a unit of memory that is dedicated to storing file data. The blocks reside within the cache appliance memory. Even though NAS protocols are file-based, cache management may be simplified by superimposing a block approach.

As packet data flows through the cache appliance, the control plane 1110 and data plane 1120 interact to process read and write requests in the packets. As explained more fully below, the data plane 1120 takes in client and filer traffic via the ingress interface 1002 and processes it through a pipeline of one or more operations performed by the engines 1021-1024 in the data plane 1020 which interact with the managers 1011-1018 in the control plane 1010. At any point during the processing, the data plane 1020 may forward a packet out through the egress interface 1008 because it is finished servicing the operation, or the packet is not pertinent to the system, or for other reasons. The data plane 1020 may also forward a packet over the interfaces 1031-1033 to the cluster interface 1006 to forward the packet to another node in the cluster.

When a client/filer packet is first received by the cache appliance 830 at the ingress 1002, the packet is forwarded to the filter engine 1021 over the interface 1025. The filter engine 1021 parses and extracts the L2-L4 fields in the packet to compute a packet context. As illustrated, an n-tuple generator 831 may be implemented in the filter engine 1021 to the extent that the predetermined fields from the packet header used to form the n-tuple are located in the extracted L2-L4 fields. The filter engine 1021 also verifies the packet by computing the IP checksum so that any invalid packet can be dropped. If the received packet is not a TCP/IP or UDP/IP packet, the filter engine 1021 forwards the packet over the interface 1040 to the egress 1008. However, if a TCP/IP or UDP/IP packet is received, the filter engine 1021 obtains the source interface for the packet from the local interface (LIF) manager 1015 which uses a set of physical interfaces belonging to a logical interface to perform link aggregation, port bonding and fail-over, thereby insulating other parts of the system from these L2 details. The LIF manager 1015 provides APIs for the management plane 832 to create and configure logical interfaces, and also provides APIs for the data plane 1020 to determine which logical interface a particular packet arrived on. The filter engine 1021 then uses the source interface to pass the packet and context over the interface 1026 to the flow engine 1022.

At the flow engine 1022, any IP fragment packets are queued until the last fragment is received. In addition, the flow engine 1022 verifies the packet by computing the TCP or UDP checksums so that any invalid packet can be dropped. The flow engine 1022 also looks up the TCP/UDP port in the port map manager 1011 which contains information about the UDP/TCP ports being used by the filers to provide storage services, such as by maintaining a table that maps IP addresses and a UDP/TCP port numbers to a service such as NFS, MOUNT and HTTP. If the received packet is not a TCP/UDP port is not for storage service, the flow engine 1022 forwards the packet over the interface 1040 to the egress 1008. However, if the TCP/UDP port is for storage service, the flow engine 1022 uses the packet 5-tuple to look up the flow record from the flow manager 1012 which stores a flow table indexed by 5-tuples that allows clients to store and retrieve flow-specific data. To this end, a dual hash lookup module 832 in the flow engine 1022 may be used to rapidly search through thousands of connections which are indexed by network protocol addressing model using two irreducible CRC has functions. The flow manager 1012 may also provide a flow balancing service (to spread flows across the cluster's processing elements) and flow serialization (to ensure that each flow is handled by a single processing element). If the flow for the received packet belongs to another node in the cluster, then the flow engine 1022 forwards the packet and context to the flow engine on that node via the interface 1031 and cluster interface 1006. The flow engine 1022 also re-sequences any out-of-order packets, updates sequence numbers and stores the updated sequence number in the context before passing the packet and context over the interface 1027 to the file engine 1023.

At the file engine 1023, upstream packets (e.g., from client to filer) are parsed to extract the L5-L7 fields from the packet and store them in the context or connection state table. If the file engine 1023 determines that an incomplete L7 packet is received, the packet is sent to a reassembly queue. If the received packet is a storage control plane (mount, portmap, etc.), the file engine 1023 forwards the packet and context to the file manager 1018 which maintains file meta-data—such as a name space tree (similar to a dentry tree), individual file records (analogous to inodes), and reverse lookup tables-and correlates file references to ensure cache coherency. Any response packets detected at the file engine 1023 may be dropped, and any read or write requests are stored in the transaction manager 1017 where they are correlated with filer responses for purposes of populating the cache when a read miss occurs (by generating a filer request/reply), cleaning a dirty cache block when a outstanding write acknowledgment comes back from the filer, and updating internal file records when file management requests are answered by the filer. By calculating an internal file handle (IFH), the file engine 1023 can retrieve a file record from the file manager 1018. For example, file records can be retrieved by using a dual hash lookup module 833 in the file engine 1023 to rapidly search through thousands of files which are indexed by network protocol addressing model using two irreducible CRC has functions. The file engine 1023 also checks to see if the read or write request is allowed by querying the policy manager 1016 which provides a unified interface for querying cache policies and resolving conflicts between multiple policies. If the packet contains a file management request, the file engine 1023 constructs an answer from any available file record information and forwards the answer over the interface 1040 to the egress 1008. File management requests that cannot be answered from the file record are forwarded over the interface 1040 to the egress 1008. Finally, if the packet contains a read or write request, the file engine 1023 forwards the request to the cache engine 1024.

Downstream packets (e.g., from filer to the client) are processed differently by the file engine 1023, though some of the processing is the same. First, the downstream packets are parsed to extract the L5-L7 fields which are stored in the context. Incomplete L7 packets are sent to a reassembly queue. If the received packet is a storage control plane (mount, portmap, etc.), the file engine 1023 forwards the packet and context to the file manager 1018. Any request packets from the filer detected at the file engine 1023 may be dropped, and the transaction manager 1017 may be used to look up a corresponding request. If a corresponding request is found, the file engine 1023 updates the packet context using the dual hash lookup module 833 to locate the connection state table where the context is stored, but otherwise drops the packet. If the packet contains a file management reply from the filer, the file engine 1023 updates the file record in the file manager 1018. However, if the packet contains a read/write reply from the filer, the packet is forwarded to the cache engine 1024. Any other packets are forwarded over the interface 1040 to the egress 1008.

A packet that makes it to the cache engine 1024 is a read/write request from a client or a read/write response from a filer. For any read request received from a client, the cache engine 1024 receives the packet and context over the interface 1028. Using the internal file handle, offset and length contained in context, the cache engine 1024 determines the list of data blocks for the read request. The cache engine 1024 then queries the cache manager 1014 to determine if the requested data is located within the cluster's cache. To assist with file searching or location service provided by the cache manager 1014, a dual hash lookup module 834 in the cache engine 1024 may be used to rapidly search through thousands of file blocks which are indexed by network protocol addressing model using two irreducible CRC has functions. Each instance of the cache manager 1014 is responsible for receiving and processing cache requests (converted from NAS file requests) for locally cached data. The cache manager 1014 organizes the RAM—assigned to the data cache—into a collection of data blocks of equal size that are used to store and manage file data. In addition to storing data in cache blocks, the cache manager 1014 may also recycle cache blocks using the LRU-2 algorithm whenever its data cache is over-committed (i.e., the cache is 100% full when a cache-miss occurs). Upon receiving a read request, the cache manager 1014 checks to see if the requested data is present within the cache, such as by using the dual hash indexing techniques described herein. If so, this is considered a read cache-hit, and the cache engine 1024 then fetches the data blocks from the cache memory platform. Otherwise, this is a read cache-miss, and the cache manager 1014 sends a read request back to the cache engine 1024 so that it can be forwarded to the filer. The returned data is cached in one or more cache blocks, and the read request is then satisfied from the cache. Finally, the cache block is promoted based on the LRU-2 algorithm. In forwarding a request to the filer, the cache manager 1014 may modify it so that the returned data (from the filer) fills an entire cache block. Finally, the cache engine 1024 formulates one or more response packets to the read request, and sends the requested read data in a response to the client. However, if a client's request is for data that is not in the cache appliance 840 (a read miss), the cache engine 1024 sends a request to the filer for any missing data blocks, and then awaits a response from the filer. As indicated above, this response from the filer is received from the file engine 1023, and includes a context from which the cache engine 1024 determines the list of data blocks. This information is used by the cache engine 1024 to store the missing data blocks in the cache, and to formulate one or more response packets that are send to the client.

For a write request from a client to write data to the cache appliance 840, the cache engine 1024 receives the packet and context from the file engine 1023 over the interface 1028. Using the internal file handle, offset and length contained in context, the cache engine 1024 determines the list of data blocks for the write request, and then stores the data blocks to the cache memory platform, at which point they are marked as "dirty." The cache engine 1024 then commits a write request to the cache manager 1014 which includes a journal which is a fault-tolerant transaction log of the application's write operations that is used exclusively for failure recovery. The cache manager 1014 uses the journal to record write requests in a persistent-store. The store behaves as a transaction log where write requests are began, canceled, and completed. The transactions are stored in a fault-tolerant way such that it requires the failure of three nodes before the data is lost. Upon receiving a write request, the cache manager 1014 checks to see if the requested data is present within the cache, such as by using the dual hash indexing techniques described herein. If so, then the cache manager 1014 updates the local cache block with the new data. The cache block is also promoted. Next, the data is submitted to the journal so that it can be written to the cluster. Finally, the request is acknowledged as having been completed. Once the requested write operation is completed, the cache engine 1024 formulates and sends one or more response packets to the client, and then sends write requests for the dirty blocks to filer in order to initiate flushing of dirty cache blocks.

When a filer responds to a write request with a write reply, the cache engine 1024 receives the packet and context from the file engine 1023 over the interface 1028. Using the internal file handle, offset and length contained in context, the cache engine 1024 determines the list of data blocks for the write reply, marks the cached data blocks as "clean" and commits a write request to the journal in the cache manager 1014.

To coordinate and manage the individual cache appliance nodes within the cache 840, the control plane includes a cluster manager 1013 which is responsible for managing node membership and fail-over processing in the cluster 1006. Node membership management involves detecting and handling the movement of nodes in and out of the cluster 1006, and also responds to individual node failures. The cluster manager 1013 notifies registered clients of cluster membership events (e.g., by providing a notification whenever the cluster has been reconfigured). In addition, the cluster manager 1013 provides query services to specify the identity of the cluster, the cluster count, and the ID of each member of the cluster. The cluster manager 1013 may also be responsible for mapping of the data within the cache cluster to specify on which node a particular cache block resides. In other words, it provides a location service for the data.

By now it should be appreciated that there is provided herein a method and system for retrieving connection information from memory, such as a cache memory module. In the disclosed methodology, a first connection identifier is determined or extracted from a received packet for retrieving connection information corresponding to the received packet, such as by extracting an n-tuple (e.g., the SIP, DIP, SP, and DP segments) from each received packet. A first hash value is calculated from the first connection identifier to generate a first memory address for a first table in memory corresponding to the first connection identifier. In addition, a second hash value is calculated from the first connection identifier to generate a first index to the first table corresponding to the first connection identifier. In selected embodiments, the first and second hash values are calculated as 18-bit values by applying two irreducible CRC hash functions to the first connection identifier, and the resulting hash values are then shifted by a predetermined number of bit positions (e.g., 4) to generate the first memory address and first index, respectively. Using the first memory address and first index, a first entry is retrieved from the first table and used to generate a second memory address for retrieving connection information from a connection state table in memory corresponding to the first connection.

In another form, there is provided a method and system for storing connection information in memory, such as a cache memory. As disclosed, a first connection identifier is determined or extracted from a received packet for storing connection information corresponding to the received packet, such as by extracting an n-tuple (e.g., the SIP, DIP, SP, and DP segments) from each received packet. Using the first connection identifier, a first memory address for a first table in memory is generated corresponding to the first connection identifier by calculating a first hash value from the first connection identifier. In addition, a first index to the first table corresponding to the first connection identifier is generated by calculating a second hash value from the first connection identifier. In selected embodiments, the first and second hash values are calculated as 18-bit values by applying two irreducible CRC hash functions to the first connection identifier, and the resulting hash values are then shifted by a predetermined number of bit positions (e.g., 4) to generate the first memory address and first index, respectively. For example, the first hash value may be calculated by applying a first irreducible CRC polynomial hash function=$X0^{\wedge}X1^{\wedge}X13^{\wedge}X17^{\wedge}X18^{\wedge}$ to the first connection identifier, and the first index may be calculated by applying a second irreducible CRC polynomial hash function=$X0^{\wedge}X1^{\wedge}X3^{\wedge}X5^{\wedge}X7^{\wedge}X17^{\wedge}X18$ to the first connection identifier. After generating a unique identifier, the first index and the unique identifier are stored in an available entry in the first table located at the first memory address, and connection information is stored at a second memory address in a connection state table in memory corresponding to the first connection, where the second memory address is generated from the unique identifier.

As will be appreciated by one skilled in the art, the present invention may be embodied in whole or in part as a method, system, or computer program product. For example, a computer-usable medium embodying computer program code may be used, where the computer program code comprises computer executable instructions configured to provide non-disruptive, adaptive storage caching using clustered cache appliances with packet inspection intelligence. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

The foregoing description has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification and example implementations provide a complete description of the manufacture and use of the composition of the invention. Since many embodiments of the invention can be made without departing from the spirit and scope of the invention, the invention resides in the claims hereinafter appended.

What is claimed is:

1. A standalone cache unit for caching data operations requested from one or more networked data storage devices by one or more remote clients, the standalone cache unit comprising:

a cache memory for caching data that is requested by a remote client, the cache memory storing a plurality of index tables and a connection state table for each connection used to cache data in the cache memory;

a packet processor coupled to the cache memory and to one or more I/O ports for transparently splicing connections between the data storage devices and remote clients, where the packet processor inspects network protocol traffic state parameters received on the I/O ports to determine if a request from a remote client can be serviced by the standalone cache unit by extracting connection information from each received packet and generating first and second hash values from the connection information, where the first hash value is used to point to an addressed index table from the plurality of index tables, and where the second hash value is stored as an index to an entry in the addressed index table which also stores a connection data index value which is used to point to an address for the connection state table corresponding to the received packet.

2. The standalone cache unit of claim 1, where each of the plurality of index tables comprises a plurality of entries, where each entry comprises an index portion which stores a second hash value computed from one of the cached connections, and an output portion which stores a connection data index value which is used to point to an address for the connection state table corresponding to the received packet.

3. The standalone cache unit of claim 1, where the packet processor extracts connection information by extracting an n-tuple from each received packet.

4. The standalone cache unit of claim 1, where the packet processor extracts connection information by assembling at least a source IP address (SIP) segment, a destination IP address (DIP) segment, a source transport port (SP) segment, and a destination transport port (DP) segment from each received packet.

5. The standalone cache unit of claim 1, where the packet processor generates first and second hash values from the connection information by applying two irreducible CRC hash functions to the connection information.

6. The standalone cache unit of claim 1, where the first hash value is used to point to an addressed index table by shifting the first hash value by a predetermined number of bit positions.

7. The standalone cache unit of claim 1, where the connection data index value is used to point to an address for the connection state table by shifting the connection data index value by a predetermined number of bit positions.

8. The standalone cache unit of claim 1, where the packet processor executes software that transparently monitors NFS and CIFS traffic between remote clients and NAS subsystems.

9. A method for retrieving connection information from a memory, comprising:
   determining a first connection identifier from a received packet for retrieving connection information corresponding to the received packet;
   generating a first memory address for a first table in memory corresponding to the first connection identifier by calculating a first hash value from the first connection identifier;
   generating a first index to the first table corresponding to the first connection identifier by calculating a second hash value from the first connection identifier;
   retrieving from the first table a first entry using the first index; and
   generating from the first entry a second memory address for retrieving connection information from a connection state table in memory corresponding to the first connection.

10. The method of claim 9, where determining the first connection identifier comprises extracting an n-tuple from each received packet.

11. The method of claim 9, where determining the first connection identifier comprises extracting at least a source IP address (SIP) segment, a destination IP address (DIP) segment, a source transport port (SP) segment, and a destination transport port (DP) segment from each received packet.

12. The method of claim 9, where the first and second hash values are calculated by applying two irreducible CRC hash functions to the first connection identifier.

13. The method of claim 9, where generating the first memory address comprises shifting the first hash value by a predetermined number of bit positions.

14. The method of claim 9, where generating the first memory address comprises calculating a first 18-bit hash value and then shifting the first 18-bit hash value by four bit positions.

15. The method of claim 9, where generating the first index comprises shifting the second hash value by a predetermined number of bit positions.

16. The method of claim 9, where generating the first index comprises calculating a second 18-bit hash value and then shifting the second 18-bit hash value by four bit positions.

17. A method for storing connection information in memory, comprising:
   determining a first connection identifier from a received packet for storing connection information corresponding to the received packet;
   generating a first memory address for a first table in memory corresponding to the first connection identifier by calculating a first hash value from the first connection identifier;
   generating a first index to the first table corresponding to the first connection identifier by calculating a second hash value from the first connection identifier;
   generating a unique identifier;
   storing the first index and the unique identifier in an available entry in the first table located at the first memory address; and
   storing connection information at a second memory address in a connection state table in memory corresponding to the first connection, where the second memory address is generated from the unique identifier.

18. The method of claim 17, where determining the first connection identifier comprises extracting an n-tuple from each received packet.

19. The method of claim 17, where the first and second hash values are calculated by applying two irreducible CRC hash functions to the first connection identifier.

20. The method of claim 17, where generating a first memory address comprises applying a first irreducible CRC polynomial hash function=$X0^{\wedge}X1^{\wedge}X13^{\wedge}X17^{\wedge}X18$ to the first connection identifier, and where generating a first index comprises applying a second irreducible CRC polynomial hash function=$X0^{\wedge}X1^{\wedge}X3^{\wedge}X5^{\wedge}X7^{\wedge}X17^{\wedge}X18$ to the first connection identifier.

* * * * *